US010750655B2

(12) United States Patent
Henry

(10) Patent No.: US 10,750,655 B2
(45) Date of Patent: Aug. 25, 2020

(54) REAL-TIME ARTIFICIAL INTELLIGENCE CONTROL OF AGRICULTURAL WORK VEHICLE OR IMPLEMENT BASED ON OBSERVED OUTCOMES

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 245 days.

(21) Appl. No.: 16/014,279

(22) Filed: Jun. 21, 2018

(65) Prior Publication Data
US 2019/0387658 A1 Dec. 26, 2019

(51) Int. Cl.
| A01B 79/00 | (2006.01) |
| A01B 3/14 | (2006.01) |
| A01B 76/00 | (2006.01) |
| A01B 63/14 | (2006.01) |
| A01B 49/02 | (2006.01) |

(52) U.S. Cl.
CPC ............ *A01B 79/005* (2013.01); *A01B 63/14* (2013.01); *A01B 76/00* (2013.01); *A01B 49/02* (2013.01)

(58) Field of Classification Search
USPC ........................................................ 701/50
See application file for complete search history.

(56) References Cited

U.S. PATENT DOCUMENTS 3,862,339 A 1/1975 Balboni
7,369,924 B2 5/2008 Han et al.
8,706,341 B2 4/2014 Madsen et al.
8,862,339 B2 10/2014 Henry et al.
9,113,589 B2 8/2015 Bassett
9,282,688 B2 * 3/2016 Casper ................. A01B 79/005
9,389,615 B2 7/2016 Webber et al.
(Continued)

FOREIGN PATENT DOCUMENTS

WO WO2016/201508 A1 12/2016

OTHER PUBLICATIONS

Taft, John Deere Adds AL, IoT to Farm Equipment, eWeek, Sep. 6, 2016, 4 pages. http://www.eweek.com/innovation/john-deere-adds-ai-iot-to-farm-equipment?pag2e=2.

*Primary Examiner* — Tyler D Paige
(74) *Attorney, Agent, or Firm* — Rebecca L. Henkel; Rickard K. DeMille

(57) ABSTRACT

Systems and methods for real-time, artificial intelligence control of an agricultural work vehicle and/or implement based on observed outcomes are provided. In particular, example aspects of the present subject matter are directed to systems and method that sense field conditions (also known as field "finish") both before and after adjustable ground-engaging tools encounter the soil and that update a site-specific control model that provides control settings based on the observed anterior and posterior conditions. Thus, a control system can obtain sensor data descriptive of upcoming field conditions and can perform predictive adjustment and control of tools based the upcoming field conditions. The system can then use additional sensors to observe the outcome of the employed control settings. Based on a comparison of the observed outcome to a target outcome, the system can adjust for the next encounter of similar field conditions.

20 Claims, 5 Drawing Sheets

(56) References Cited

U.S. PATENT DOCUMENTS

| | | | |
|---|---|---|---|
| 9,392,746 B2 | 7/2016 | Darr et al. | |
| 10,194,574 B2* | 2/2019 | Knobloch | A01B 29/046 |
| 10,255,670 B1* | 4/2019 | Wu | H04N 5/2252 |
| 2008/0140431 A1* | 6/2008 | Anderson | A01B 79/005 |
| | | | 701/50 |
| 2011/0153172 A1 | 6/2011 | Anderson | |
| 2013/0037286 A1* | 2/2013 | Knobloch | A01O 5/062 |
| | | | 172/640 |
| 2013/0199807 A1* | 8/2013 | Hoffman | A01B 49/027 |
| | | | 172/1 |
| 2014/0312165 A1 | 10/2014 | Mkrtchyan | |
| 2016/0247076 A1 | 8/2016 | Mewes et al. | |
| 2016/0247082 A1* | 8/2016 | Stehling | G06N 7/005 |
| 2017/0049044 A1 | 2/2017 | Stoller et al. | |
| 2018/0303022 A1* | 10/2018 | Barrick | A01B 35/32 |
| 2018/0321683 A1* | 11/2018 | Foster | G05D 1/0219 |
| 2018/0325015 A1* | 11/2018 | Wolters | A01B 79/005 |
| 2019/0150357 A1* | 5/2019 | Wu | G06T 7/0004 |
| 2019/0166753 A1* | 6/2019 | Hoffman | A01B 63/26 |
| 2019/0387658 A1* | 12/2019 | Henry | A01B 63/14 |

\* cited by examiner

REAL-TIME ARTIFICIAL INTELLIGENCE CONTROL OF AGRICULTURAL WORK VEHICLE OR IMPLEMENT BASED ON OBSERVED OUTCOMES

FIELD OF THE INVENTION

The present subject matter relates generally to agricultural systems and, more particularly, to systems and methods for real-time, artificial intelligence control of an agricultural work vehicle or implement based on observed outcomes.

BACKGROUND OF THE INVENTION

Conditions in a field, including the environmental and/or seed-bed conditions in a field, can impact the efficacy of agricultural operations performed on the field.

As one example, for various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and/or by slowing down seed germination. As such, the ability to monitor and/or adjust the amount of crop residue remaining within a field can be very important to maintaining a healthy, productive field, particularly when it comes to performing tillage operations.

As another example, for various reasons, it is important to maintain a given amount of soil roughness within a field before or following an agricultural operation. For example, when planting seeds it is generally not desired to have soil clods that are larger than a certain size.

However, respective conditions throughout most fields are highly variable. That is, conditions at one portion of the field may be significantly different than conditions at a different portion of the field. Thus, when using agricultural machinery to manipulate (e.g., till and/or plant within) the field, the control settings used to successfully obtain a desired finish for one portion of the field may not directly translate to another portion of the field. That is, due to varying conditions within a field, agricultural tools needs to be adjusted to account for site-specific conditions.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a system for intelligent control of one or both of an agricultural work vehicle or implement. The system includes one or more anterior sensor devices positioned to collect anterior sensor data in a forward direction relative to a path of travel of the agricultural work vehicle or implement through a field. The system includes one or more posterior sensor devices positioned to collect posterior sensor data in a rearward direction relative to the path of travel of the agricultural work vehicle or implement through the field. The system includes a computing system that includes one or more processors and one or more non-transitory computer-readable media that collectively store a site-specific control model that provides sets of output controls respectively for sets of input conditions. The one or more non-transitory computer-readable media collectively store instructions that, when executed by the one or more processors, configure the one or more processors to perform operations. The operations include obtaining, from the one or more anterior sensor devices, anterior sensor data that describes a portion of the field. The operations include determining an anterior set of conditions for the portion of the field based at least in part on the anterior sensor data. The operations include using the site-specific control model to obtain a first set of output controls based at least in part on the anterior set of conditions. The operations include controlling one or both of the agricultural work vehicle or implement according to the first set of output controls to cause a manipulation of the portion of the field. The operations include obtaining, from the one or more posterior sensor devices, posterior sensor data that describes the portion of the field after the manipulation of the portion of the field. The operations include determining a posterior set of conditions for the portion of the field based at least in part on the posterior sensor data. The operations include comparing the posterior set of conditions to a target set of conditions for the portion of the field. The operations include updating the site-specific control model based at least in part on the comparison of the posterior set of conditions to the target set of conditions for the portion of the field to form an updated version of the site-specific control model Another example aspect of the present disclosure is directed to a computer-implemented method for control of one or both of an agricultural work vehicle or implement. The method includes obtaining, by a computing system comprising one or more computing devices and from one or more anterior sensor devices positioned to collect anterior sensor data in a forward direction relative to a path of travel of the agricultural work vehicle or implement through a field, anterior sensor data that describes a portion of the field. The method includes determining, by the computing system, an anterior set of conditions for the portion of the field based at least in part on the anterior sensor data. The method includes using, by the computing system, a site-specific control model to obtain a first set of output controls based at least in part on the anterior set of conditions. The method includes controlling, by the computing system, one or both of the agricultural work vehicle or implement according to the first set of output controls to manipulate the portion of the field. The method includes obtaining, by the computing system and from one or more posterior sensor devices positioned to collect posterior sensor data in a rearward direction relative to the path of travel of the agricultural work vehicle or implement through the field, posterior sensor data that describes the portion of the field. The method includes determining, by the computing system, a posterior set of conditions for the portion of the field based at least in part on the posterior sensor data. The method includes comparing, by the computing system, the posterior set of conditions to a target set of conditions for the portion of the field. The method includes updating, by the computing system, the site-specific control model based at least in part on the comparison of the posterior set of conditions to the target set of conditions for the portion of the field to form an updated version of the site-specific control model.

Another example aspect of the present disclosure is directed to an agricultural work vehicle or implement that includes one or more anterior sensors positioned to collect anterior sensor data in a forward direction relative to a path of travel of the agricultural work vehicle or implement through a field; one or more posterior sensors positioned to collect posterior sensor data in a rearward direction relative to the path of travel of the agricultural work vehicle or implement through the field; and a computing system that includes one or more processors and one or more non-transitory computer-readable media that collectively store a site-specific control model that provides sets of output controls for sets of input conditions; and instructions that, when executed by the one or more processors, configure the one or more processors to perform operations. The operations include obtaining, from the one or more anterior sensors, anterior sensor data that describes a portion of the field. The operations include determining an anterior set of conditions for the portion of the field based at least in part on the anterior sensor data. The operations include using the site-specific control model to obtain a first set of output controls based at least in part on the anterior set of conditions. The operations include controlling the agricultural work vehicle or implement according to the first set of output controls to manipulate the portion of the field. The operations include obtaining, from the one or more posterior sensors, posterior sensor data that describes the portion of the field. The operations include determining a posterior set of conditions for the portion of the field based at least in part on the posterior sensor data. The operations include comparing the posterior set of conditions to a target set of conditions for the portion of the field. The operations include updating the site-specific control model based at least in part on the comparison of the posterior set of conditions to the target set of conditions for the portion of the field.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
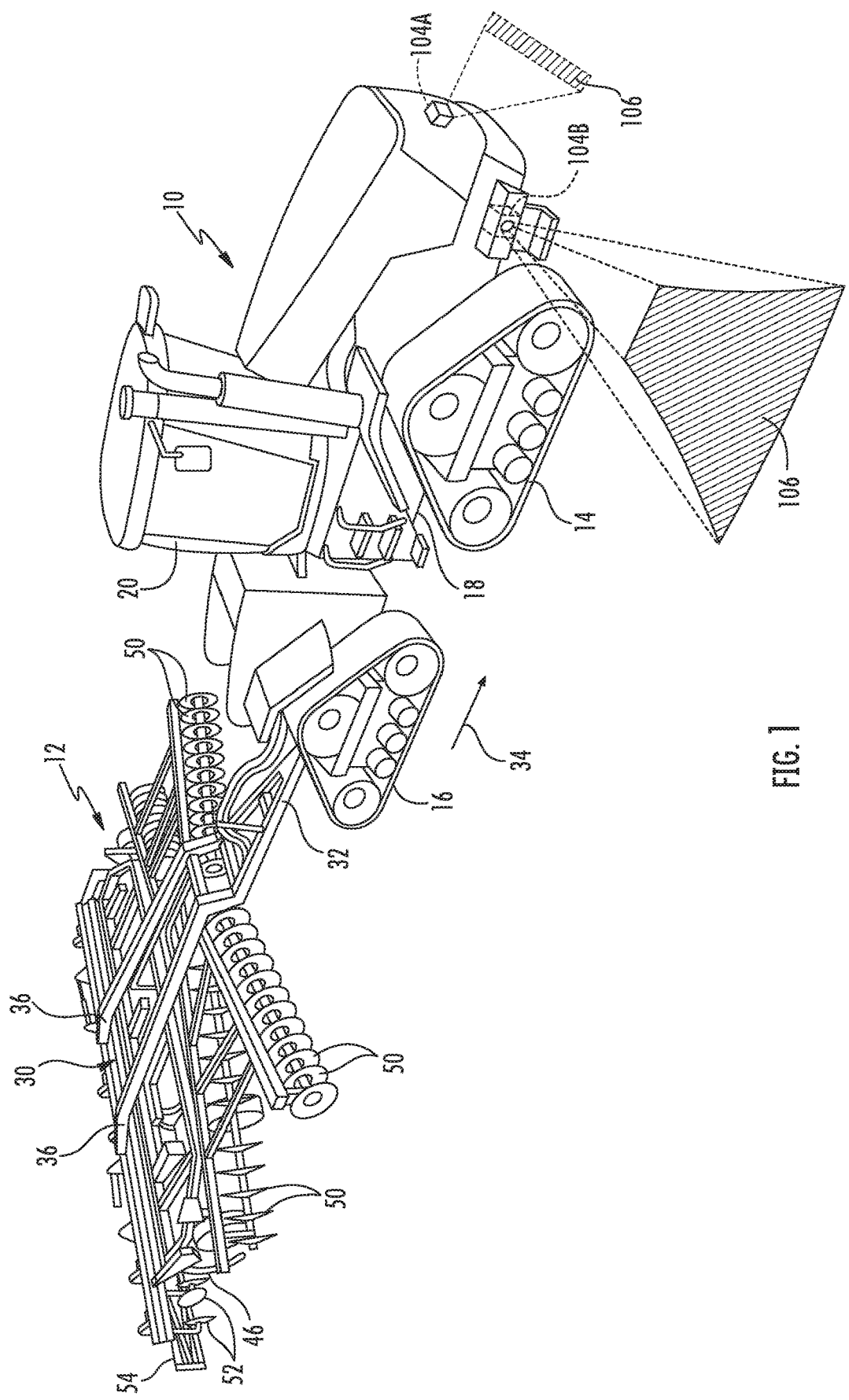
FIG. 1 illustrates a perspective view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for real-time, artificial intelligence control of an agricultural work vehicle and/or implement based on observed outcomes. In particular, example aspects of the present subject matter are directed to systems and method that sense field conditions (also known as field "finish") both before and after adjustable ground-engaging tools encounter the soil and that update a site-specific control model that provides control settings based on the observed anterior and posterior conditions. Thus, a control system can obtain sensor data descriptive of upcoming field conditions and can perform predictive adjustment and control of tools based the upcoming field conditions. The system can then use additional sensors to observe the outcome of the employed control settings. Based on a comparison of the observed outcome to a target outcome, the system can adjust for the next encounter of similar field conditions. Thus, the systems and methods of the present disclosure can be used for site-specific tillage and, in some instances, can assist in achieving uniform field conditions for planting, which results in superior agricultural outcomes.

More particularly, field conditions are highly variable throughout most fields. Thus, tillage or other agricultural tools should be adjusted to provide a more even field finish for planting, a process which can be referred to as site-specific tillage. This may mean tillage tools may need adjusting for that specific site, or the vehicle or implement may need to operate faster/slower to meet the desired field finish. Examples of different field conditions include crop residue, soil texture, weed population. Each of these conditions is typically treated differently to attempt to obtain a uniform field finish.

In view of this challenge, example aspects of the present disclosure provide real-time, artificial intelligence control of an agricultural work vehicle or implement based on observed outcomes. In one example, a control system can include one or more anterior sensor devices positioned to collect anterior sensor data in a forward direction relative to a path of travel of an agricultural work vehicle or implement through a field. The control system can also include one or more posterior sensor devices positioned to collect posterior sensor data in a rearward direction relative to the path of travel of the agricultural work vehicle or implement through the field.

As one example, the one or more anterior sensor devices can be or include an anterior imaging device positioned to have an anterior field of view in the forward direction relative to the path of travel of the agricultural work vehicle or implement through the field. Likewise, the one or more posterior sensor devices can be or include a posterior imaging device positioned to have a posterior field of view in the rearward direction relative to the path of travel of the agricultural work vehicle or implement through the field.

A computing system (e.g., system located on the work vehicle or implement) can obtain, from the one or more anterior sensors devices, anterior sensor data that describes a portion of the field. For example, the portion of the field can be an upcoming portion of the field at the time the anterior sensor data is collected. The sensor data can be any type of sensor data from any number of different sensors, including, for example, image data collected from an anterior imaging device.

The computing system can determine an anterior set of conditions for the portion of the field based at least in part on the anterior sensor data. For example, any number of different techniques or algorithms can be employed to determine the anterior set of conditions based on the anterior sensor data. Example conditions that can be considered include clod size; percent residue cover; soil roughness; weed population; presence of valleys or holes; untilled soil levelness; compaction layer; moisture level; soil type; and/or any other field conditions. The field conditions can be derived directly from the sensor data and/or can be derived from other conditions, measurements, or metrics that are derived directly from the sensor data.

According to an aspect of the present disclosure, the computing system can include a site-specific control model that provides sets of output controls respectively for sets of input conditions. As one example, the site-specific control model can be a lookup table that includes a plurality of sets of possible input conditions respectively correlated with a plurality of sets of output controls As another example, the site-specific control model can be a machine-learned model, such as, for example, artificial neural networks, decision tree-based models, linear models, and/or other forms of machine-learned models.

The computing system can use the site-specific control model to obtain a first set of output controls based at least in part on the anterior set of conditions for the portion of the field. As examples, the first set of output controls can be descriptive of controls for one or more of the following: downforce of one or more ground-engaging tools; penetration depth of the one or more ground-engaging tools; angle of the one or more ground-engaging tools; speed of the agricultural work vehicle; and/or other control settings or parameters.

As one example, if the site-specific control model is a lookup table, the computing system can match the anterior set of conditions to a closest one of the plurality of sets of possible input conditions. The computing system can then obtain the set of output controls correlated in the lookup table with the closest one of the plurality of sets of possible input conditions. In some embodiments, matching the anterior set of conditions to the closest one of the plurality of sets of possible input conditions can include performing a clustering algorithm to match the anterior set of conditions to the closest one of the plurality of sets of possible input conditions. For example, the clustering algorithm can include a nearest neighbor algorithm or similar.

The computing system can control the agricultural work vehicle or implement according to the first set of output controls to cause a manipulation (e.g., tillage, planting, etc.) of the portion of the field. Thus, the system can perform site-specific control based on the observed anterior conditions.

After controlling the agricultural work vehicle or implement according to the first set of output controls, the computing system can obtain, from the one or more posterior sensor devices, posterior sensor data that describes the portion of the field after the manipulation of the portion of the field. Thus, the posterior sensor data can describe conditions at the portion of the field after the manipulation was performed according to the set of output controls.

The computing system can determine a posterior set of conditions for the portion of the field based at least in part on the posterior sensor data. For example, any number of different techniques or algorithms can be employed to determine the posterior set of conditions based on the posterior sensor data. Example conditions that can be considered include clod size; percent residue cover; soil roughness; weed population; presence of valleys or holes; untilled soil levelness; compaction layer; moisture level; soil type; and/or any other field conditions. The field conditions can be derived directly from the sensor data and/or can be derived from other conditions, measurements, or metrics that are derived directly from the sensor data.

The computing system can compare the posterior set of conditions to a target set of conditions for the portion of the field. For example, the target set of conditions can be user-supplied target conditions, default target conditions, location-specific target conditions (e.g., Northeastern Ohio target conditions), soil type-specific target conditions, crop-specific target conditions, time-of-year-specific target conditions, and/or other types of target conditions. Thus, the posterior sensor data can be analyzed to determine how successful use of the set of output controls was to achieve the target conditions.

According to another aspect of the present disclosure, the computing system can update the site-specific control model based at least in part on the comparison of the posterior set of conditions to the target set of conditions for the portion of the field to form an updated version of the site-specific control model. The model can be updated at each instance of observation or can be updated using a batch of observations. Thus, in one example, the relationships between observed inputs and outputs embodied by the site-specific control model can be continuously or periodically updated based on newly observed conditions data. In such fashion, varying conditions and outcomes within a field can be accounted for in a fine-tuned fashion which closely matches the anterior conditions with an appropriate set of output controls which has been updated to account for recently observed outcomes using such controls.

As one example, in embodiments in which the site-specific control model includes a lookup table, updating the site-specific control model based at least in part on the comparison of the posterior set of conditions to the target set of conditions for the portion of the field can include updating the set of output controls that were obtained from the lookup table and used (i.e., the set of output controls that were correlated with the closest one of the plurality of sets of possible input conditions that matched the anterior conditions). As another example, in embodiments in which the site-specific control model includes a machine-learned model, updating the site-specific control model based at least in part on the comparison of the posterior set of conditions to the target set of conditions for the portion of the field can include re-training the machine-learned model based on a loss function that evaluates a difference between the posterior set of conditions and the target set of conditions Thus, an agricultural work vehicle according to aspects of the present disclosure can include both forward-looking and rearward-looking sensors that enable determining both anterior and posterior field conditions. In view of such, the systems and methods can learn the appropriate site-specific controls for given anterior conditions over time by observing the posterior conditions and comparing them to target conditions. This enables accurate and proactive control. The system will update the control model to adjust for the next similar soil condition encounter, thereby leading to improved posterior field conditions and superior agricultural outcomes.

Figure 2:
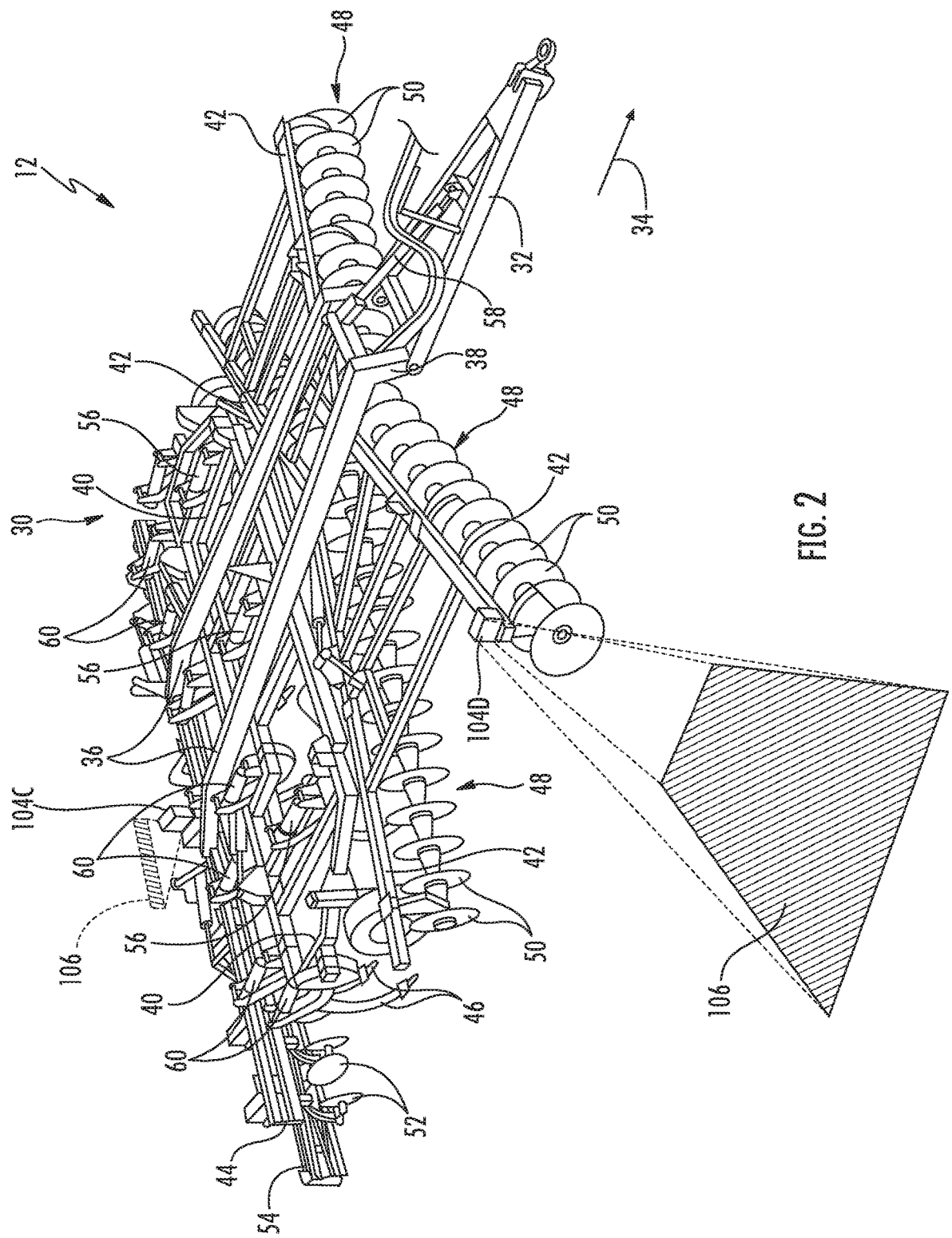
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair of rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle via a pull hitch or tow bar 32 in a travel direction of the vehicle (e.g., as indicated by arrow 34). The carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

As another example, ground-engaging tools can include harrows which can include, for example, a number of tines or spikes, which are configured to level or otherwise flatten any windrows or ridges in the soil. The implement 12 may include any suitable number of harrows. In fact, some embodiments of the implement 12 may not include any harrows.

In some embodiments, the implement 12 may optionally include one or more additional ground-engaging tools, such as one or more basket assemblies or rotary firming wheels. The baskets may be configured to reduce the number of clods in the soil and/or firm the soil over which the implement 12 travels. Each basket may be configured to be pivotally coupled to one of the frames 40, 42, 44, or other components of the implement 12. It should be appreciated that the implement 12 may include any suitable number of baskets. In fact, some embodiments of the implement 12 may not include any baskets.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

In addition, the implement 12 may also include any number of suitable actuators (e.g., hydraulic cylinders) for adjusting the relative positioning, penetration depth, and/or down force associated with the various ground-engaging tools (e.g., ground-engaging tools 46, 50, 52, 54). For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the disk forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12 or other modifications.

Additionally, in accordance with aspects of the present subject matter, the work vehicle 10 and/or the implement 12 may include or have associated therewith an automatic field measurement system. The automatic field measurement system can automatically or in an at least partially-automated fashion generate field conditions data that includes measurements of one or more conditions of a field. The conditions data can include anterior conditions data and/or posterior conditions data. Example conditions of a field include crop residue conditions (e.g., percent crop residue cover), soil roughness conditions (e.g., average soil clod size, clod density, or other roughness characteristics), weed population; presence of valleys or holes; untilled soil levelness; compaction layer; moisture level; soil type; and/or other measures of various conditions or characteristics of a field.

Generally, the automatic field measurement system can include one or more sensors (e.g., as shown at 121 in FIG. 3) that generate data that can be processed to measure the field conditions. The sensors can be any type of sensors including depth sensors, humidity sensors, temperature sensors, surface roughness sensors, vision sensors such as imaging device, acoustic sensors, and/or other types of sensors.

Thus, in some embodiments, as illustrated in FIGS. 1 and 2, the work vehicle 10 and/or the implement 12 may have one or more imaging devices coupled thereto and/or supported thereon for capturing images or other image data associated with the field as an operation is being performed via the implement 12. Specifically, in several embodiments, the imaging device(s) may be provided in operative association with the work vehicle 10 and/or the implement 12 such that the imaging device(s) has a field of view directed towards a portion(s) of the field disposed in front of, behind, and/or underneath some portion of the work vehicle 10 and/or implement 12 such as, for example, alongside one or both of the sides of the work vehicle 10 and/or the implement 12 as the implement 12 is being towed across the field. As such, the imaging device(s) may capture images from the tractor 10 and/or implement 12 of one or more portion(s) of the field being passed by the tractor 10 and/or implement 12.

In general, the imaging device(s) may correspond to any suitable device(s) configured to capture images or other image data of the field that allow the field's soil to be distinguished from the crop residue remaining on top of the soil. For instance, in several embodiments, the imaging device(s) may correspond to any suitable camera(s), such as single-spectrum camera or a multi-spectrum camera configured to capture images, for example, in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) may correspond to any other suitable image capture device(s) and/or vision system(s) that is capable of capturing "images" or other image-like data that allow the crop residue existing on the soil to be distinguished from the soil. For example, the imaging device(s) may correspond to or include radio detection and ranging (RADAR) sensors and/or light detection and ranging (LIDAR) sensors.

It should be appreciated that work vehicle 10 and/or implement 12 may include any number of imaging device(s) 104 or other sensors provided at any suitable location that allows images of the field to be captured as the vehicle 10 and implement 12 traverse through the field. For instance, FIGS. 1 and 2 illustrate examples of various locations for mounting one or more imaging device(s) for capturing images of the field. Specifically, as shown in FIG. 1, in one embodiment, one or more imaging devices 104A may be coupled to the front of the work vehicle 10 such that the imaging device(s) 104A has a field of view 106 that allows it to capture images of an adjacent area or portion of the field disposed in front of the work vehicle 10. For instance, the field of view 106 of the imaging device(s) 104A may be directed outwardly from the front of the work vehicle 10 along a plane or reference line that extends generally parallel to the travel direction 34 of the work vehicle 10. In addition to such imaging device(s) 104A (or as an alternative thereto), one or more imaging devices 104B may also be coupled to one of the sides of the work vehicle 10 such that the imaging device(s) 104B has a field of view 106 that allows it to capture images of an adjacent area or portion of the field disposed along such side of the work vehicle 10. For instance, the field of view 106 of the imaging device(s) 104B may be directed outwardly from the side of the work vehicle 10 along a plane or reference line that extends generally perpendicular to the travel direction 34 of the work vehicle 10.

Similarly, as shown in FIG. 2, in one embodiment, one or more imaging devices 104C may be coupled to the rear of the implement 12 such that the imaging device(s) 104C has a field of view 106 that allows it to capture images of an adjacent area or portion of the field disposed aft of the implement. For instance, the field of view 106 of the imaging device(s) 104C may be directed outwardly from the rear of the implement 12 along a plane or reference line that extends generally parallel to the travel direction 34 of the work vehicle 10. In addition to such imaging device(s) 104C (or as an alternative thereto), one or more imaging devices 104D may also be coupled to one of the sides of the implement 12 such that the imaging device(s) 104D has a field of view 106 that allows it to capture images of an adjacent area or portion of the field disposed along such side of the implement 12. For instance, the field of view 106 of the imaging device 104D may be directed outwardly from the side of the implement 12 along a plane or reference line that extends generally perpendicular to the travel direction 34 of the work vehicle 10.

It should be appreciated that, in alternative embodiments, the imaging device(s) 104 may be installed at any other suitable location that allows the device(s) to capture images of an adjacent portion of the field, such as by installing an imaging device(s) at or adjacent to the aft end of the work vehicle 10 and/or at or adjacent to the forward end of the implement 12. It should also be appreciated that, in several embodiments, the imaging devices 104 may be specifically installed at locations on the work vehicle 10 and/or the implement 12 to allow images to be captured of the field both before and after the performance of a field operation by the implement 12. For instance, by installing the imaging device 104A at the forward end of the work vehicle 10 and the imaging device 104C at the aft end of the implement 12, the anterior imaging device 104A may capture images of the field prior to performance of the field operation while the posterior imaging device 104C may capture images of the same portions of the field following the performance of the field operation.

Figure 3:
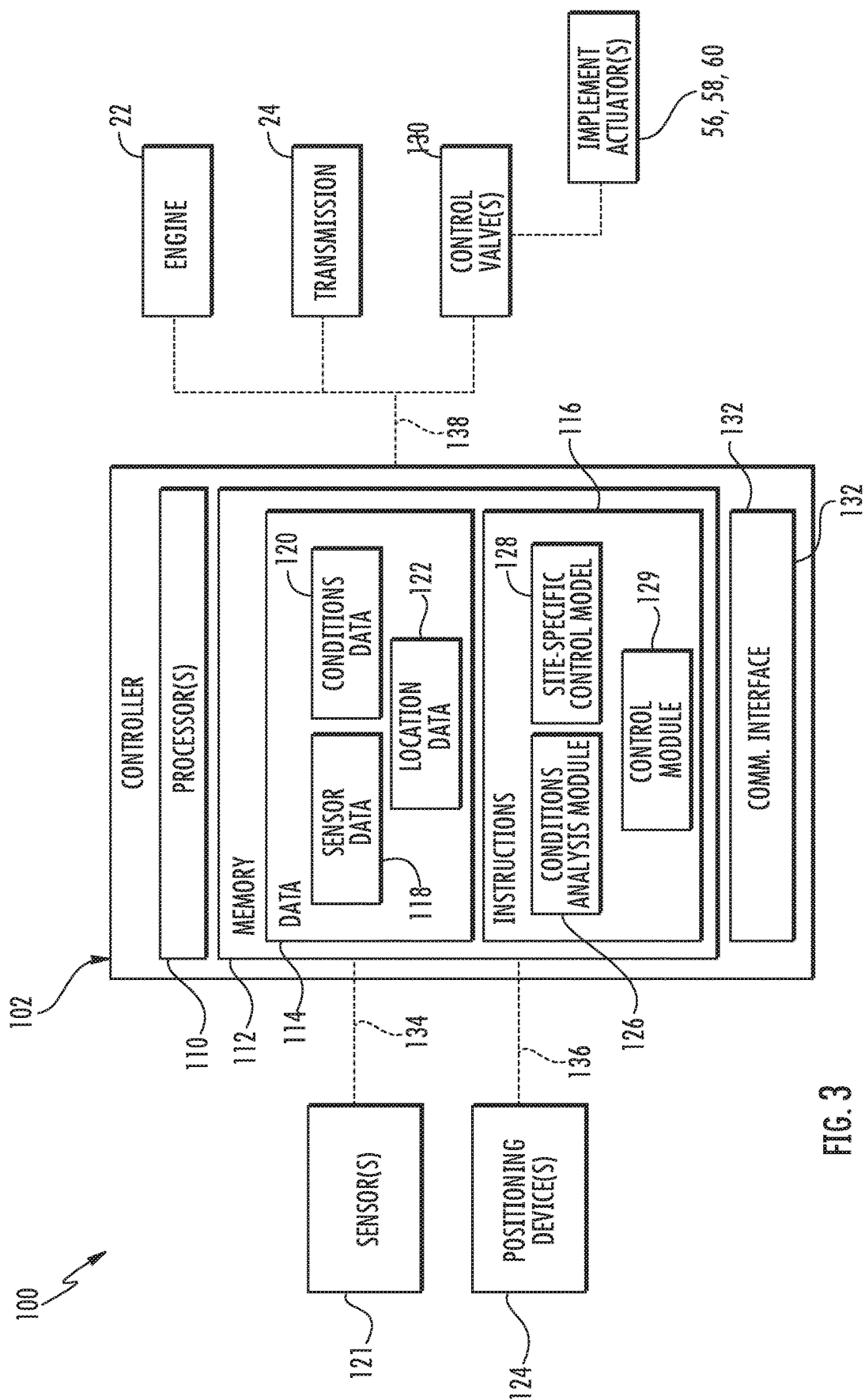
FIG. 3 illustrates a schematic view of one embodiment of a computing system in accordance with aspects of the present subject matter.
Figure 4:
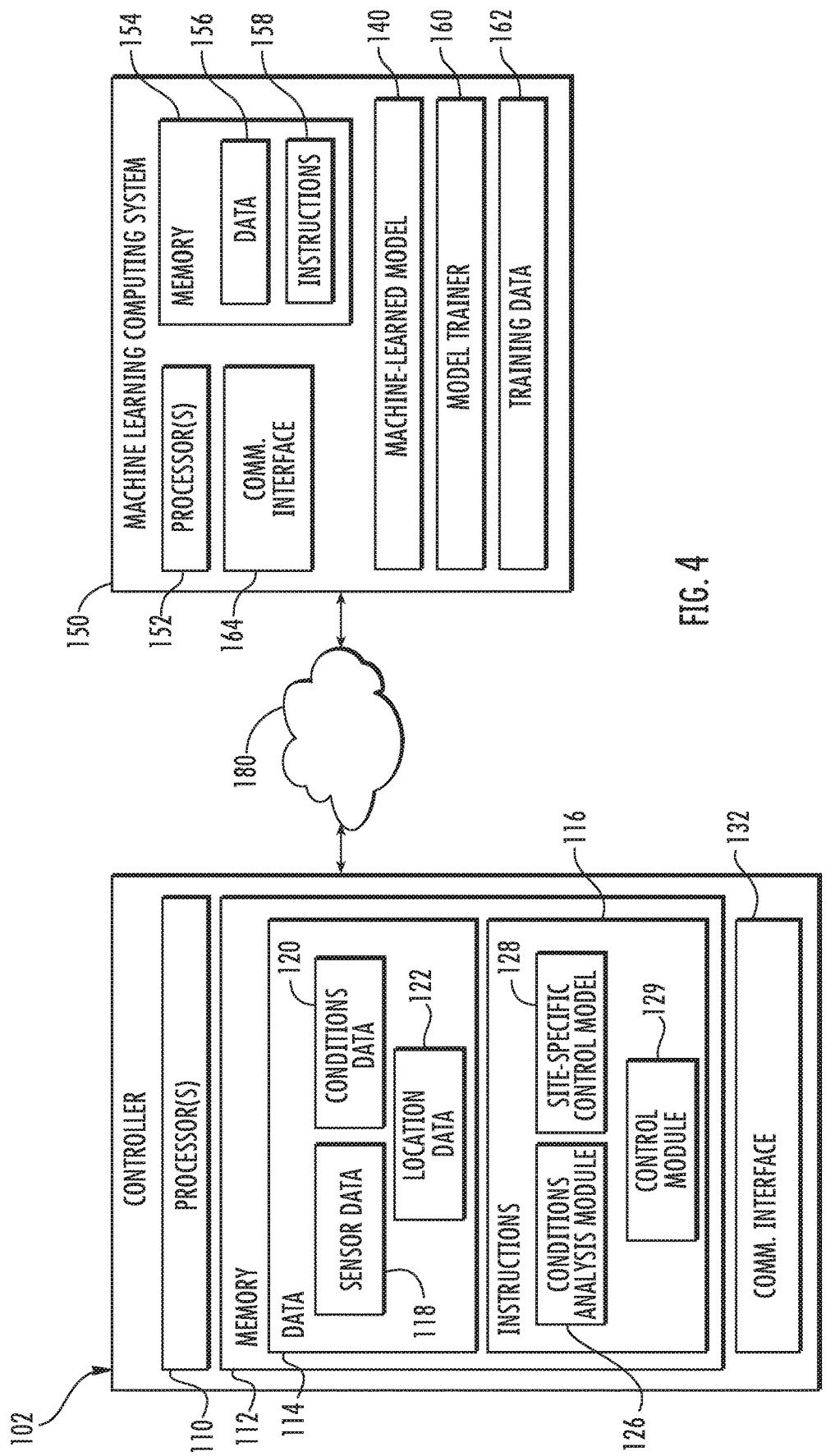
FIG. 4 illustrates a schematic view of one embodiment of a computing system in accordance with aspects of the present subject matter.

Referring now to FIGS. 3 and 4, schematic views of embodiments of a computing system 100 are illustrated in accordance with aspects of the present subject matter. In general, the system 100 will be described herein with reference to the work vehicle 10 and the implement 12 described above with reference to FIGS. 1 and 2. However, it should be appreciated that the disclosed system 100 may generally be utilized with work vehicles having any suitable vehicle configuration and/or implements have any suitable implement configuration.

In several embodiments, the system 100 may include a controller 102 and various other components configured to be communicatively coupled to and/or controlled by the controller 102, such as one or more sensors 121 and/or various components of the work vehicle 10 and/or the implement 12. In some embodiments, the controller 102 is physically coupled to the work vehicle 10 and/or the implement 12. In other embodiments, the controller 102 is not physically coupled to the work vehicle 10 and/or the implement 12 (e.g., remotely located from the work vehicle 10 and/or the implement 12) and instead may communicate with the work vehicle 10 and/or the implement 12 over a wireless network.

As will be described in greater detail below, the controller 102 may be configured to perform real-time artificial intelligence-based site-specific control. In particular, FIG. 3 illustrates a computing environment in which the controller 102 can operate to generate conditions data 120 (e.g., anterior conditions data and/or posterior conditions data) based on sensor data newly received from one or more sensors 121. That is, FIG. 3 illustrates a computing environment in which the controller 102 is actively used in conjunction with a work vehicle and/or implement (e.g., during operation of the work vehicle and/or implement within a field). As will be discussed further below, FIG. 4 depicts a computing environment in which the controller 102 can communicate over a network 180 with a machine learning computing system 150 to train and/or receive a site-specific control model 128. Thus, FIG. 4 illustrates operation of the controller 102 to train a site-specific control model 128 and/or to receive a trained site-specific control model 128 from a machine learning computing system 150 (e.g., FIG. 4 shows the "training stage") while FIG. 3 illustrates operation of the controller 102 to use the site-specific control model 128 to actively provide output controls for use in a field (e.g., FIG. 3 shows "inference stage"). However, as noted elsewhere herein, the site-specific control model 128 is not required to be a machine-learned model and may, in some embodiments, be a "hand-crafted" heuristic or impose a hand-crafted relationship.

Referring first to FIG. 3, in general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a sensor data database 118 for storing sensor data received from the sensors 121. For example, the sensors 121 may be configured to continuously or periodically generate sensor data descriptive of adjacent portion(s) of the field as an operation is being performed with the field. In such an embodiment, the sensor data transmitted to the controller 102 from the sensors 121 may be stored within the sensor data database 118 for subsequent processing and/or analysis. It should be appreciated that, as used herein, the term sensor data may include any suitable type of data received from sensors, including image data received from the imaging device(s) 104 that allows for the crop residue coverage of a field to be analyzed, including photographs and other image-related data (e.g., scan data and/or the like).

Additionally, as shown in FIG. 3, the memory 12 may include a conditions data database 120 for storing conditions data (e.g., anterior conditions data and posterior conditions data) for the field being processed. For example, as indicated above, based on the sensor data received from the sensors 121, the controller 102 may be configured to generate field conditions data associated with the field and can re-calibrate the site-specific control model 128 based on such data.

Moreover, in several embodiments, the memory 12 may also include a location database 122 storing location information about the work vehicle/implement 10, 12 and/or information about the field being processed (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the exact location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the sensor data stored within the sensor data database 118 and/or the conditions data stored within the conditions data database 120. For instance, in one embodiment, the location coordinates derived from the positioning device(s) 124 and the sensor data captured by the sensors 121 may both be time-stamped. In such an embodiment, the time-stamped data may allow sensor data captured by the sensors 121 to be matched or correlated to a corresponding set of location coordinates received from the positioning device(s) 124, thereby allowing the precise location of the portion of the field described by a given set of sensor data to be known (or at least capable of calculation) by the controller 102.

Moreover, by matching sensor data to a corresponding set of location coordinates, the controller 102 may also be configured to generate or update a corresponding field map associated with the field being processed. For example, in instances in which the controller 102 already includes a field map stored within its memory 112 that includes location coordinates associated with various points across the field, sensor data captured by the imaging device(s) 104 may be mapped or correlated to a given location within the field map. Alternatively, based on the location data and the associated sensor data, the controller 102 may be configured to generate a field map for the field that includes the geo-located sensor data associated therewith.

Referring still to FIG. 3, in several embodiments, the instructions 116 stored within the memory 112 of the controller 102 may be executed by the processor(s) 110 to implement a conditions analysis module 126. In general, the conditions analysis module 126 may be configured to analyze the sensor data 118 to determine the conditions data 120. Further, as will be discussed further below, the conditions analysis module 126 can cooperatively operate with or otherwise leverage a site-specific control model 128 to determine a set of output controls based on the determined conditions. Further, in some embodiments, the conditions analysis module 126 can update the site-specific control model 128. As an example, the conditions analysis module 126 can perform some or all of method 200 of FIG. 5. Although the conditions analysis module 126 is described as performing generation of automatic field conditions data; determination of the appropriate set of output controls; and update of the model 128, in some embodiments, these operations are performed by separate components or modules.

Moreover, as shown in FIG. 3, the instructions 116 stored within the memory 112 of the controller 102 may also be executed by the processor(s) 110 to implement a site-specific control model 128. The site-specific control model 128 can describe or apply a relationship between anterior field conditions and output controls to be executed by the control module 129.

Referring still to FIG. 3, the instructions 116 stored within the memory 112 of the controller 102 may also be executed by the processor(s) 110 to implement a control module 129. In general, the control module 129 may be configured to adjust the operation of the work vehicle 10 and/or the implement 12 by controlling one or more components of the implement/vehicle 12, 10. The control module 129 may be configured to adjust the operation of the work vehicle 10 and/or the implement 12 in a manner designed to modify the outcome of the operation of the work vehicle 10 and/or the implement 12. That is, the control module 129 can control the work vehicle 10 and/or the implement 12 according to a set of output controls.

In one aspect, the one or more sensors 121 (e.g., imaging devices 104) can include anterior image devices that collect image data that depicts upcoming portions of the field. The conditions analysis module 126 can analyze the image data to determine anterior conditions data for such upcoming portions of the field. The conditions analysis module 126 can use the site-specific control model 128 to determine a set of output controls based on the anterior conditions data. The control module 129 can control the operation of the work vehicle 10 and/or the implement 12 according to the set of output controls for such upcoming portions of the field. Thus, the system 100 can proactively manage various operational parameters of the work vehicle 10 and/or the implement 12 to account for upcoming field conditions in upcoming portions of the field. For example, if an upcoming portion of the field has a larger-than-average soil roughness percentage, then the controller 102 can, in anticipation of reaching such section, modify the operational parameters to account for such larger-than-average soil roughness and vice versa for portions with less-than-average soil roughness.

In another aspect, the one or more sensors 121 (e.g., imaging devices 104) can include posterior image devices that collect image data that depicts receding portions of the field that the work vehicle 10 and/or implement 12 has recently operated upon. The conditions analysis module 126 can analyze the image data to determine posterior conditions data for such receding portions of the field. The conditions analysis module 126 can update the site-specific control model 128 based on a comparison of the posterior conditions data to target conditions data. Thus, the system 100 can reactively manage various operational parameters of the work vehicle 10 and/or the implement 12 based on observed outcomes associated with the employed control settings. That is, the system 100 can observe the outcome of the employed settings and can adjust the control model 128 if the outcome does not match a target outcome.

It should be appreciated that the controller 102 may be configured to implement various different control actions to adjust the operation of the work vehicle 10 and/or the implement 12 in a manner that increases or decreases various field conditions in the field. In one embodiment, the controller 102 may be configured to increase or decrease the operational or ground speed of the implement 12 to affect an increase or decrease certain field conditions such as percent crop residue cover and/or soil roughness. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In some embodiments, the implement 12 can communicate with the work vehicle 10 to request or command a particular ground speed and/or particular increase or decrease in ground speed from the work vehicle 10. For example, the implement 12 can include or otherwise leverage an ISOBUS Class 3 system to control the speed of the work vehicle 10.

Increasing the ground speed of the vehicle 10 and/or the implement 12 may result in a relative increase in the amount of soil roughness and/or crop residue remaining in the field (e.g., relative to the amount remaining absent such increase in ground speed). Likewise, decreasing the ground speed of the vehicle 10 and/or the implement 12 may result in a relative decrease in the amount of soil roughness and/or crop residue remaining in the field (e.g., relative to the amount remaining absent such decrease in ground speed).

In addition to the adjusting the ground speed of the vehicle/implement 10, 12 (or as an alternative thereto), the controller 102 may also be configured to adjust an operating parameter associated with the ground-engaging tools of the implement 12. For instance, as shown in FIG. 3, the controller 102 may be communicatively coupled to one or more valves 130 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the relative positioning, penetration depth, down force, angle of engagement, and/or any other suitable operating parameter associated with the ground-engaging tools of the implement 12. Increasing the penetration depth or down force of the ground-engaging tools may result in a relative decrease in the amount of soil roughness and/or crop residue remaining in the field (e.g., relative to the amount remaining absent such increase in penetration depth or down force). Likewise, decreasing the penetration depth or down force of the ground-engaging tools may result in a relative increase in the amount of soil roughness and/or crop residue remaining in the field (e.g., relative to the amount remaining absent such decrease in penetration depth or down force).

Referring now to FIG. 4, according to an aspect of the present disclosure, the controller 102 can store or include one or more site-specific control models 128. In some embodiments, the site-specific control models 128 can be or can otherwise include various machine-learned models such as a machine-learned regression model; a support vector machine; one or more decision trees; a neural network; and/or other types of models including both linear models and non-linear models.

Example machine-learned regression models perform linear regression, polynomial regression, or nonlinear regression. Example machine-learned regression models can perform simple regression or multiple regression. In some embodiments, a softmax function or layer can be used to squash a set of real values respectively associated with two or more possible outputs to a set of real values in the range (0, 1) that sum to one.

Example neural networks include feed-forward neural networks, recurrent neural networks (e.g., long short-term memory recurrent neural networks), convolutional neural networks, or other forms of neural networks.

However, in some embodiments, the site-specific control models 128 are not machine-learned but may instead be hand-crafted heuristics or other data structures that provide a set of output controls in response to a set of input conditions data. For example, the control model 128 can be or include a lookup table.

In some embodiments in which the site-specific control models 128 are machine-learned, the controller 102 can receive the one or more site-specific control models 128 from the machine learning computing system 150 over network 180 and can store the one or more site-specific control models 128 in the memory 112. The controller 102 can then use or otherwise run the one or more site-specific control models 128 (e.g., by processor(s) 110).

The machine learning computing system 150 includes one or more processors 152 and a memory 154. The one or more processors 152 can be any suitable processing device such as described with reference to processor(s) 110. The memory 154 can include any suitable storage device such as described with reference to memory 112.

The memory 154 can store information that can be accessed by the one or more processors 152. For instance, the memory 154 (e.g., one or more non-transitory computer-readable storage mediums, memory devices) can store data 156 that can be obtained, received, accessed, written, manipulated, created, and/or stored. In some embodiments, the machine learning computing system 150 can obtain data from one or more memory device(s) that are remote from the system 150.

The memory 154 can also store computer-readable instructions 158 that can be executed by the one or more processors 152. The instructions 158 can be software written in any suitable programming language or can be implemented in hardware. Additionally, or alternatively, the instructions 158 can be executed in logically and/or virtually separate threads on processor(s) 152.

For example, the memory 154 can store instructions 158 that when executed by the one or more processors 152 cause the one or more processors 152 to perform any of the operations and/or functions described herein.

In some embodiments, the machine learning computing system 150 includes one or more server computing devices. If the machine learning computing system 150 includes multiple server computing devices, such server computing devices can operate according to various computing architectures, including, for example, sequential computing architectures, parallel computing architectures, or some combination thereof.

In addition or alternatively to the model(s) 128 at the controller 102, the machine learning computing system 150 can include one or more site-specific control models 140. For example, the models 140 can be or can otherwise include various site-specific control models such as any of the example models described above with reference to models 128.

In some embodiments, the machine learning computing system 150 can communicate with the controller 102 according to a client-server relationship. For example, the machine learning computing system 150 can implement the site-specific control models 140 to provide a web service to the controller 102. For example, the web service can provide real-time vehicle or implement control as a service.

Thus, site-specific control models 128 can located and used at the controller 102 and/or site-specific control models 140 can be located and used at the machine learning computing system 150.

In some embodiments, the machine learning computing system 150 and/or the controller 102 can train the site-specific control models 128 and/or 140 through use of a trainer 160. The trainer 160 can train the site-specific control models 128 and/or 140 using one or more training or learning algorithms. One example training technique is backwards propagation of errors ("backpropagation"). Gradient-based or other training techniques can be used.

In some embodiments, the trainer 160 can perform supervised training techniques using a set of labeled training data 162. For example, the labeled training data 162 can include a set of anterior conditions data that is labeled with the "correct" set of output controls. Thus, the labeled training data can provide examples of inputs and respective outputs that, when used, achieve target conditions. In other embodiments, the trainer 160 can perform unsupervised training techniques using a set of unlabeled training data 162.

The trainer 160 can perform a number of generalization techniques to improve the generalization capability of the models being trained. Generalization techniques include weight decays, dropouts, or other techniques. The trainer 160 can be implemented in hardware, software, firmware, or combinations thereof.

Furthermore, as indicated above, the site-specific control models 128 are not required to be machine-learned models but can instead be heuristics or other algorithms or structures that provide output controls for respective input conditions data.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a communications interface using any type of protocol, protection scheme, encoding, format, packaging, etc.

FIGS. 3 and 4 illustrate example computing systems that can be used to implement the present disclosure. Other computing systems can be used as well. For example, in some embodiments, the controller 102 can include the trainer 160 and the training dataset 162. In such embodiments, the site-specific control models 128 can be both trained and used locally at the controller 102. As another example, in some embodiments, the controller 102 is not connected to other computing systems.

Figure 5:
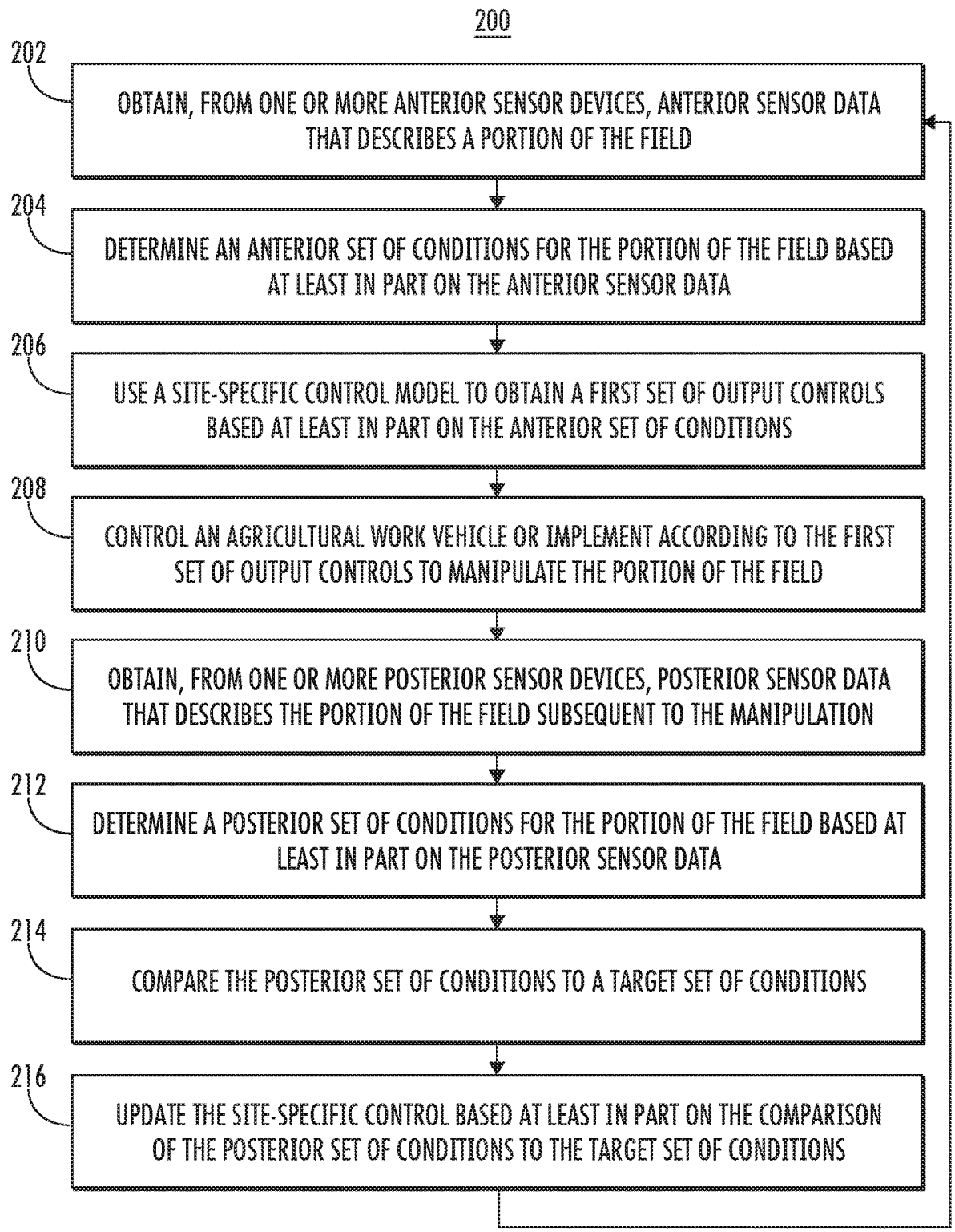
FIG. 5 illustrates a flow diagram of one embodiment of a method for intelligent control of an agricultural work vehicle or implement in accordance with aspects of the present subject matter.

Referring now to FIG. 5, a flow diagram of one embodiment of a method 200 for intelligent control of an agricultural work vehicle or implement is illustrated in accordance with aspects of the present subject matter. In general, the method 200 will be described herein with reference to the work vehicle 10 and the implement 12 shown in FIGS. 1 and 2, as well as the various system components shown in FIGS. 3 and/or 4. However, it should be appreciated that the disclosed method 200 may be implemented with work vehicles and/or implements having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include obtaining, from one or more anterior sensor devices, anterior sensor data that describes a portion of the field. For example, as indicated above, the conditions analysis module 126 of the controller 102 may be configured to receive, from the one or more anterior sensor devices, anterior sensor data that describes a portion of the field.

As one example, the one or more anterior sensor devices can be or include an anterior imaging device positioned to have an anterior field of view in the forward direction relative to the path of travel of the agricultural work vehicle or implement through the field. Likewise, the one or more posterior sensor devices can be or include a posterior imaging device positioned to have a posterior field of view in the rearward direction relative to the path of travel of the agricultural work vehicle or implement through the field.

At (204), the method 200 may include determining an anterior set of conditions for the portion of the field based at least in part on the anterior sensor data. For example, the conditions analysis module 126 can determine an anterior set of conditions for the portion of the field based at least in part on the anterior sensor data.

For example, any number of different techniques or algorithms can be employed to determine the anterior set of conditions based on the anterior sensor data. Example conditions that can be considered include clod size; percent residue cover; soil roughness; weed population; presence of valleys or holes; moisture level; soil type; and/or any other field conditions. The field conditions can be derived directly from the sensor data and/or can be derived from other conditions, measurements, or metrics that are derived directly from the sensor data.

At (206), the method 200 may include using the site-specific control model to obtain a first set of output controls based at least in part on the anterior set of conditions. For example, the conditions analysis module 126 can use the site-specific control model 128 to obtain a first set of output controls based at least in part on the anterior set of conditions.

As one example, the site-specific control model can be a lookup table that includes a plurality of sets of possible input conditions respectively correlated with a plurality of sets of output controls As another example, the site-specific control model can be a machine-learned model, such as, for example, artificial neural networks, decision tree-based models, linear models, and/or other forms of machine-learned models.

The computing system can use the site-specific control model to obtain a first set of output controls based at least in part on the anterior set of conditions for the portion of the field. As examples, the first set of output controls can be descriptive of controls for one or more of the following: downforce of one or more ground-engaging tools; penetration depth of the one or more ground-engaging tools; angle of the one or more ground-engaging tools; speed of the agricultural work vehicle; and/or other control settings or parameters.

As one example, if the site-specific control model is a lookup table, the computing system can match the anterior set of conditions to a closest one of the plurality of sets of possible input conditions. The computing system can then obtain the set of output controls correlated in the lookup table with the closest one of the plurality of sets of possible input conditions. In some embodiments, matching the anterior set of conditions to the closest one of the plurality of sets of possible input conditions can include performing a clustering algorithm to match the anterior set of conditions to the closest one of the plurality of sets of possible input conditions. For example, the clustering algorithm can include a nearest neighbor algorithm or similar.

At (208), the method 200 may include controlling the agricultural work vehicle or implement according to the first set of output controls to cause a manipulation of the portion of the field. For example, as indicated above, the control module 129 of the controller 102 of the disclosed system 100 may be configured to control the operation of the work vehicle 10 and/or the implement 12, such as by controlling one or more components of the work vehicle 10 and/or the implement 12 to allow an operation to be performed within the field (e.g., a tillage operation). Thus, the system can perform site-specific control based on the observed anterior conditions.

At (210), the method 200 may include obtaining, from one or more posterior sensor devices, posterior sensor data that describes the portion of the field after the manipulation of the portion of the field. For example, as indicated above, the control module 129 of the controller 102 of the disclosed system 100 may be configured to obtain, from one or more posterior sensor devices, posterior sensor data that describes the portion of the field after the manipulation of the portion of the field. Thus, the posterior sensor data can describe conditions at the portion of the field after the manipulation was performed according to the set of output controls.

At (212), the method 200 may include determining a posterior set of conditions for the portion of the field based at least in part on the posterior sensor data. For example, as indicated above, the control module 129 of the controller 102 of the disclosed system 100 may be configured to determine a posterior set of conditions for the portion of the field based at least in part on the posterior sensor data.

For example, any number of different techniques or algorithms can be employed to determine the posterior set of conditions based on the posterior sensor data. Example conditions that can be considered include clod size; percent residue cover; soil roughness; weed population; presence of valleys or holes; moisture level; soil type; and/or any other field conditions. The field conditions can be derived directly from the sensor data and/or can be derived from other conditions, measurements, or metrics that are derived directly from the sensor data.

At (214), the method 200 may include comparing the posterior set of conditions to a target set of conditions for the portion of the field. For example, as indicated above, the control module 129 of the controller 102 of the disclosed system 100 may be configured to compare the posterior set of conditions to a target set of conditions for the portion of the field.

For example, the target set of conditions can be user-supplied target conditions, default target conditions, location-specific target conditions (e.g., Northeastern Ohio target conditions), soil type-specific target conditions, crop-specific target conditions, time-of-year-specific target conditions, and/or other types of target conditions. Thus, the posterior sensor data can be analyzed to determine how successful use of the set of output controls was to achieve the target conditions.

The comparison can be performed according to a number of techniques, including, as one example, through use of a loss function that evaluates a difference (e.g., a squared difference) between the posterior conditions and the target conditions for each of a number of different condition types.

At (216), the method 200 may include updating the site-specific control model based at least in part on the comparison of the posterior set of conditions to the target set of conditions for the portion of the field to form an updated version of the site-specific control model. For example, as indicated above, the control module 129 of the controller 102 of the disclosed system 100 may be configured to update the site-specific control model based at least in part on the comparison of the posterior set of conditions to the target set of conditions for the portion of the field to form an updated version of the site-specific control model.

Thus, in one example, the relationships between observed inputs and outputs embodied by the site-specific control model can be continuously or periodically updated based on newly observed conditions data. In such fashion, varying conditions and outcomes within a field can be accounted for in a fine-tuned fashion which closely matches the anterior conditions with an appropriate set of output controls which has been updated to account for recently observed outcomes using such controls.

As one example, in embodiments in which the site-specific control model includes a lookup table, updating the site-specific control model based at least in part on the comparison of the posterior set of conditions to the target set of conditions for the portion of the field can include updating the set of output controls that were obtained from the lookup table and used (i.e., the set of output controls that were correlated with the closest one of the plurality of sets of possible input conditions that matched the anterior conditions). For examples, the output controls can be modified by taking, for each of one or more control parameters in the set of controls, a step along a modification table that guides modification of the controls based on the comparison. In another example, binary search techniques can be used to modify the controls to search for optimal controls based on the comparison. Other optimization techniques can be used as well.

As another example, in embodiments in which the site-specific control model includes a machine-learned model, updating the site-specific control model based at least in part on the comparison of the posterior set of conditions to the target set of conditions for the portion of the field can include re-training the machine-learned model based on a loss function that evaluates a difference between the posterior set of conditions and the target set of conditions. Thus, in some embodiments, online hard example mining can be used to update the control model.

After (216), method (200) can return to (202). Thus, in some embodiments, method (200) can be performed iteratively in real-time as operations are conducted in the field. In some embodiments, as illustrated in FIG. 5, the site-specific control model is updated at each iteration of method (200). In other embodiments, the site-specific control model is updated after a number (e.g., greater than 1) of iterations of the method (200) are performed such that the model is updated based on a batch of comparisons.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for intelligent control of one or both of an agricultural work vehicle or implement, comprising:
one or more anterior sensor devices positioned to collect anterior sensor data in a forward direction relative to a path of travel of the agricultural work vehicle or implement through a field;
one or more posterior sensor devices positioned to collect posterior sensor data in a rearward direction relative to the path of travel of the agricultural work vehicle or implement through the field;
a computing system comprising one or more processors and one or more non-transitory computer-readable media that collectively store:
a site-specific control model that provides sets of output controls respectively for sets of input conditions; and
instructions that, when executed by the one or more processors, configure the one or more processors to perform operations, the operations comprising:
obtaining, from the one or more anterior sensor devices, anterior sensor data that describes a portion of the field;
determining an anterior set of conditions for the portion of the field based at least in part on the anterior sensor data;
using the site-specific control model to obtain a first set of output controls based at least in part on the anterior set of conditions;
controlling one or both of the agricultural work vehicle or implement according to the first set of output controls to cause a manipulation of the portion of the field;

obtaining, from the one or more posterior sensor devices, posterior sensor data that describes the portion of the field after the manipulation of the portion of the field;

determining a posterior set of conditions for the portion of the field based at least in part on the posterior sensor data;

comparing the posterior set of conditions to a target set of conditions for the portion of the field; and updating the site-specific control model based at least in part on the comparison of the posterior set of conditions to the target set of conditions for the portion of the field to form an updated version of the site-specific control model.

2. The system of claim 1, wherein:

the one or more anterior sensor devices comprise an anterior imaging device positioned to have an anterior field of view in the forward direction relative to the path of travel of the agricultural work vehicle or implement through the field; and the one or more posterior sensor devices comprise a posterior imaging device positioned to have a posterior field of view in the rearward direction relative to the path of travel of the agricultural work vehicle or implement through the field.

3. The system of claim 1, wherein the operations further comprise:

obtaining, from the one or more anterior sensor devices, second anterior sensor data that describes a second portion of the field;

determining a second anterior set of conditions for the second portion of the field based at least in part on the second anterior sensor data; and using the updated version of the site-specific control model to obtain a second set of output controls based at least in part on the second anterior set of conditions.

4. The system of claim 1, wherein the site-specific control model comprises a machine-learned model that is configured to receive data descriptive of sets of input conditions and to process the data to generate output controls.

5. The system of claim 4, wherein the machine-learned model comprises an artificial neural network.

6. The system of claim 4, wherein updating the site-specific control model based at least in part on the comparison of the posterior set of conditions to the target set of conditions for the portion of the field comprises re-training the machine-learned model based on a loss function that evaluates a difference between the posterior set of conditions and the target set of conditions.

7. The system of claim 1, wherein the site-specific control model comprises a lookup table that includes a plurality of sets of possible input conditions respectively correlated with a plurality of sets of output controls.

8. The system of claim 7, wherein using the site-specific control model to obtain the first set of output controls based at least in part on the anterior set of conditions comprises:

matching the anterior set of conditions to a closest one of the plurality of sets of possible input conditions; and obtaining the set of output controls correlated in the lookup table with the closest one of the plurality of sets of possible input conditions.

9. The system of claim 8, wherein matching the anterior set of conditions to the closest one of the plurality of sets of possible input conditions comprises performing a clustering algorithm to match the anterior set of conditions to the closest one of the plurality of sets of possible input conditions.

10. The system of claim 7, wherein updating the site-specific control model based at least in part on the comparison of the posterior set of conditions to the target set of conditions for the portion of the field comprises updating the set of output controls correlated with the closest one of the plurality of sets of possible input.

11. The system of claim 1, wherein the anterior set of conditions and the posterior set of conditions are descriptive of one or more of the following conditions for the portion of the field:

clod size;
percent residue cover;
soil roughness;
weed population;
presence of valleys or holes;
untilled soil levelness; or
compaction layer.

12. The system of claim 1, wherein the first set of output controls are descriptive of controls for one or more of the following:

downforce of one or more ground-engaging tools;
penetration depth of the one or more ground-engaging tools;
angle of the one or more ground-engaging tools; or
speed of the agricultural work vehicle.

13. A computer-implemented method for control of one or both of an agricultural work vehicle or implement, the method comprising:

obtaining, by a computing system comprising one or more computing devices and from one or more anterior sensor devices positioned to collect anterior sensor data in a forward direction relative to a path of travel of the agricultural work vehicle or implement through a field, anterior sensor data that describes a portion of the field;

determining, by the computing system, an anterior set of conditions for the portion of the field based at least in part on the anterior sensor data;

using, by the computing system, a site-specific control model to obtain a first set of output controls based at least in part on the anterior set of conditions;

controlling, by the computing system, one or both of the agricultural work vehicle or implement according to the first set of output controls to manipulate the portion of the field;

obtaining, by the computing system and from one or more posterior sensor devices positioned to collect posterior sensor data in a rearward direction relative to the path of travel of the agricultural work vehicle or implement through the field, posterior sensor data that describes the portion of the field;

determining, by the computing system, a posterior set of conditions for the portion of the field based at least in part on the posterior sensor data;

comparing, by the computing system, the posterior set of conditions to a target set of conditions for the portion of the field; and updating, by the computing system, the site-specific control model based at least in part on the comparison of the posterior set of conditions to the target set of conditions for the portion of the field to form an updated version of the site-specific control model.

14. The computer-implemented method of claim 13, further comprising:

obtaining, by the computing system and from the one or more anterior sensor devices, third sensor data that describes a second portion of the field;

determining, by the computing system, a second anterior set of conditions for the second portion of the field based at least in part on the third sensor data; and using, by the computing system, the updated version of the site-specific control model to obtain a second set of output controls based at least in part on the second anterior set of conditions.

15. The computer-implemented method of claim 13, wherein the site-specific control model comprises a machine-learned model that is configured to receive data descriptive of sets of input conditions and to process the data to generate output controls.

16. The computer-implemented method of claim 15, wherein the machine-learned model comprises an artificial neural network.

17. The computer-implemented method of claim 15, wherein updating, by the computing system, the site-specific control model based at least in part on the comparison of the posterior set of conditions to the target set of conditions for the portion of the field comprises re-training, by the computing system, the machine-learned model based on a loss function that evaluates a difference between the posterior set of conditions and the target set of conditions.

18. The computer-implemented method of claim 13, wherein the site-specific control model comprises a lookup table that includes a plurality of sets of possible input conditions respectively correlated with a plurality of sets of output controls.

19. The computer-implemented method of claim 18, wherein using, by the computing system, the site-specific control model to obtain a first set of output controls based at least in part on the anterior set of conditions comprises:

matching, by the computing system, the anterior set of conditions to a closest one of the plurality of sets of possible input conditions; and obtaining, by the computing system, the set of output controls correlated in the lookup table with the closest one of the sets of possible input conditions.

20. An agricultural work vehicle or implement, comprising:

one or more anterior sensors positioned to collect anterior sensor data in a forward direction relative to a path of travel of the agricultural work vehicle or implement through a field;

one or more posterior sensors positioned to collect posterior sensor data in a rearward direction relative to the path of travel of the agricultural work vehicle or implement through the field;

a computing system comprising one or more processors and one or more non-transitory computer-readable media that collectively store:

a site-specific control model that provides sets of output controls for sets of input conditions; and instructions that, when executed by the one or more processors, configure the one or more processors to perform operations, the operations comprising:

obtaining, from the one or more anterior sensors, anterior sensor data that describes a portion of the field;

determining an anterior set of conditions for the portion of the field based at least in part on the anterior sensor data;

using the site-specific control model to obtain a first set of output controls based at least in part on the anterior set of conditions;

controlling the agricultural work vehicle or implement according to the first set of output controls to manipulate the portion of the field;

obtaining, from the one or more posterior sensors, posterior sensor data that describes the portion of the field;

determining a posterior set of conditions for the portion of the field based at least in part on the posterior sensor data;

comparing the posterior set of conditions to a target set of conditions for the portion of the field; and updating the site-specific control model based at least in part on the comparison of the posterior set of conditions to the target set of conditions for the portion of the field.

\* \* \* \* \*